United States Patent
Son et al.

(10) Patent No.: US 12,243,451 B2
(45) Date of Patent: Mar. 4, 2025

(54) APPARATUS FOR DISPLAYING AT LEAST ONE VIRTUAL LANE LINE BASED ON ENVIRONMENTAL CONDITION AND METHOD OF CONTROLLING SAME

(71) Applicant: HYUNDAI MOBIS CO., LTD., Seoul (KR)

(72) Inventors: Ho Seong Son, Uiwang-si (KR); Hyeon Bin Jeong, Seongnam-si (KR); Jin Woo Noh, Uiwang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 370 days.

(21) Appl. No.: 17/934,911

(22) Filed: Sep. 23, 2022

(65) Prior Publication Data
US 2023/0141584 A1    May 11, 2023

(30) Foreign Application Priority Data
Nov. 9, 2021    (KR) ..................... 10-2021-0153203

(51) Int. Cl.
| | |
|---|---|
| G09G 3/00 | (2006.01) |
| B60Q 1/14 | (2006.01) |
| G06T 11/00 | (2006.01) |
| G06V 20/56 | (2022.01) |
| B60K 35/00 | (2006.01) |
| B60K 35/23 | (2024.01) |
| B60K 35/28 | (2024.01) |
| B60K 35/81 | (2024.01) |

(52) U.S. Cl.
CPC ........... *G09G 3/002* (2013.01); *B60Q 1/1415* (2013.01); *G06T 11/00* (2013.01); *G06V 20/588* (2022.01); *B60K 35/00* (2013.01); *B60K 35/23* (2024.01); *B60K 35/28* (2024.01); *B60K 35/81* (2024.01); *B60K 2360/166* (2024.01); *B60K 2360/349* (2024.01); *G09G 2380/10* (2013.01)

(58) Field of Classification Search
None
See application file for complete search history.

(56) References Cited

U.S. PATENT DOCUMENTS

| | | | |
|---|---|---|---|
| 2012/0044090 A1* | 2/2012 | Kahler ................... | B60Q 1/245 340/905 |
| 2018/0129854 A1* | 5/2018 | Jeon ....................... | G06T 19/006 |
| 2018/0340664 A1* | 11/2018 | Yang ..................... | F21S 41/321 |

OTHER PUBLICATIONS

Translated patent DE 102017209798 (Year: 2016).*

* cited by examiner

*Primary Examiner* — Tapas Mazumder
(74) *Attorney, Agent, or Firm* — DLA Piper LLP US (57) ABSTRACT

An apparatus for displaying at least one virtual lane line based on an environmental condition and a method of controlling the same. The method includes recognizing an actual lane line of a vehicle traveling direction through at least one sensor, determining whether a head-up display (HUD) has been installed in a vehicle, upon determining that the HUD has been installed in the vehicle, displaying a first virtual lane line corresponding to the recognized actual lane line through the HUD and displaying a second virtual lane line corresponding to the recognized actual lane line on a road surface through a headlamp, and upon determining that the HUD has not been installed in the vehicle, displaying only a third virtual lane line corresponding to the recognized actual lane line through the headlamp.

15 Claims, 7 Drawing Sheets

APPARATUS FOR DISPLAYING AT LEAST ONE VIRTUAL LANE LINE BASED ON ENVIRONMENTAL CONDITION AND METHOD OF CONTROLLING SAME

Pursuant to 35 U.S.C. § 119 (a), this application claims the benefit of Korean Patent Application No. 10-2021-0153203, filed on Nov. 9, 2021, which is hereby incorporated by reference as if fully set forth herein.

BACKGROUND OF THE DISCLOSURE

Field of the Disclosure

The present embodiments are applicable to vehicles of all fields and, more particularly, to all systems related to vehicles, for displaying virtual lane lines on the interior or exterior of a vehicle based on various environmental conditions.

Discussion of the Related Art

A survey in the year 2020 by the Korea Transportation Safety Authority showed that the fatality rate of traffic accidents on rainy days was 37.5% higher than on sunny days.

Meanwhile, Korea Expressway Corporation is trying to expand the "lane lines clearly visible in rainy weather" to all sections of the expressway in order to secure driving safety on the highway even on rainy days. The "lane lines clearly visible in rainy weather" uses a functional paint mixed with rain-type glass beads. This paint is expected to provide a safer driving environment to a certain degree than a conventional environment because lane lines are clearly visible by light specularly reflected by the glass beads even on wet lane lines and durability is high.

However, it is still difficult for even an experienced driver to accurately recognize and identify actual lane lines according to the driver's eyesight or in other poor driving environments (e.g., in snowy weather, night driving, or sunlight/sunset environments) in addition to rainy weather.

SUMMARY OF THE DISCLOSURE

Accordingly, the present disclosure is directed to an apparatus for displaying at least one virtual lane line based on an environmental condition and a method of controlling the same that substantially obviate one or more problems due to limitations and disadvantages of the related art.

An embodiment of the present disclosure is to provide a system for providing optimal virtual lane lines to a driver based on various driving/traveling environmental conditions.

Another embodiment of the present disclosure intends to use an augmented reality (AR) head-up display (HUD) system and a road irradiation headlamp by an organic combination based on a specific condition.

Another embodiment of the present disclosure is to more accurately detect information about actual lane lines through vehicle-to-everything (V2X) communication with nearby vehicles when an ego vehicle has difficulty in recognizing the actual lane lines and to provide virtual lane lines based on the information.

The objects to be achieved by the present disclosure are not limited to what has been particularly described hereinabove and other objects not described herein will be more clearly understood by persons skilled in the art from the following detailed description.

To achieve these objects and other advantages and in accordance with the purpose of the disclosure, as embodied and broadly described herein, a method of controlling an apparatus for displaying at least one virtual lane line based on an environmental condition includes recognizing an actual lane line of a vehicle traveling direction through at least one sensor, determining whether a head-up display (HUD) has been installed in a vehicle, upon determining that the HUD has been installed in the vehicle, displaying a first virtual lane line corresponding to the recognized actual lane line through the HUD and displaying a second virtual lane line corresponding to the recognized actual lane line on a road surface through a headlamp, and upon determining that the HUD has not been installed in the vehicle, displaying only a third virtual lane line corresponding to the recognized actual lane line through the headlamp.

The first virtual lane line may correspond to a first actual lane line closest to the vehicle based on the vehicle traveling direction, and the second virtual lane line may correspond to a second actual lane line located farther than the first actual lane line based on the vehicle traveling direction.

The method may further include determining whether a current environment is a sunrise or sunset environment through the at least one sensor, and upon determining that the current environment is the sunrise or sunset environment, determining whether a sun visor attached to the vehicle has been opened or closed.

The method may further include, upon determining that the sun visor attached to the vehicle is in an opened state, performing a control operation to display the virtual lane lines with a first brightness and a first thickness, and upon determining that the sun visor attached to the vehicle is in a closed state, performing a control operation to display the virtual lane lines with a second brightness and a second thickness. The first brightness may be higher than the second brightness and the first thickness may be thicker than the second thickness.

The method may further include determining whether surroundings of the vehicle are in a rainy state through the at least one sensor, and upon determining that the surroundings of the vehicle are in a rainy state, performing a control operation to display the virtual lane lines with a third brightness and a third thickness regardless of whether the sun visor has been opened or closed. The third brightness may correspond to a maximum brightness value relative to the first brightness and the second brightness, and the third thickness may correspond to a maximum thickness value relative to the first thickness and the second thickness.

The method may further include determining whether a consecutive actual lane line on the road surface is processed as a straight line by connecting three or more line segments corresponding to the actual lane line based on a preset reference stored in a memory, and upon determining that the consecutive actual lane line is not processed as the straight line, requesting at least one nearby vehicle traveling on a right side or a left side to transmit lane line information. Lane line information having highest accuracy may be used out of lane line information received from the at least one nearby vehicle based on the preset reference stored in the memory.

In another aspect of the present disclosure, a computer readable recording medium storing data for displaying at least one virtual lane line based on an environmental condition is configured to process data for an actual lane line of a vehicle traveling direction recognized through at least one sensor, process data for determining whether a head-up display (HUD) has been installed in a vehicle, upon determining that the HUD has been installed in the vehicle, process data for displaying a first virtual lane line corresponding to the recognized actual lane line through the HUD and displaying a second virtual lane line corresponding to the recognized actual lane line on a road surface through a headlamp, and upon determining that the HUD has not been installed in the vehicle, process data for displaying only the a third virtual lane line corresponding to the recognized actual lane line through the headlamp.

In another aspect of the present disclosure, an apparatus for displaying at least one virtual lane line based on to an environmental condition includes a sensor configured to recognize an actual lane line of a vehicle traveling direction, and a controller configured to determine whether a head-up display (HUD) has been installed in a vehicle. The controller may perform, upon determining that the HUD has been installed in the vehicle, a control operation to display a first virtual lane line corresponding to the recognized actual lane line through the HUD and display a second virtual lane line corresponding to the recognized actual lane line on a road surface through a headlamp, and the controller may perform, upon determining that the HUD has not been installed in the vehicle, a control operation to display only a third virtual lane line corresponding to the recognized actual lane line through the headlamp.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

Figure 1:
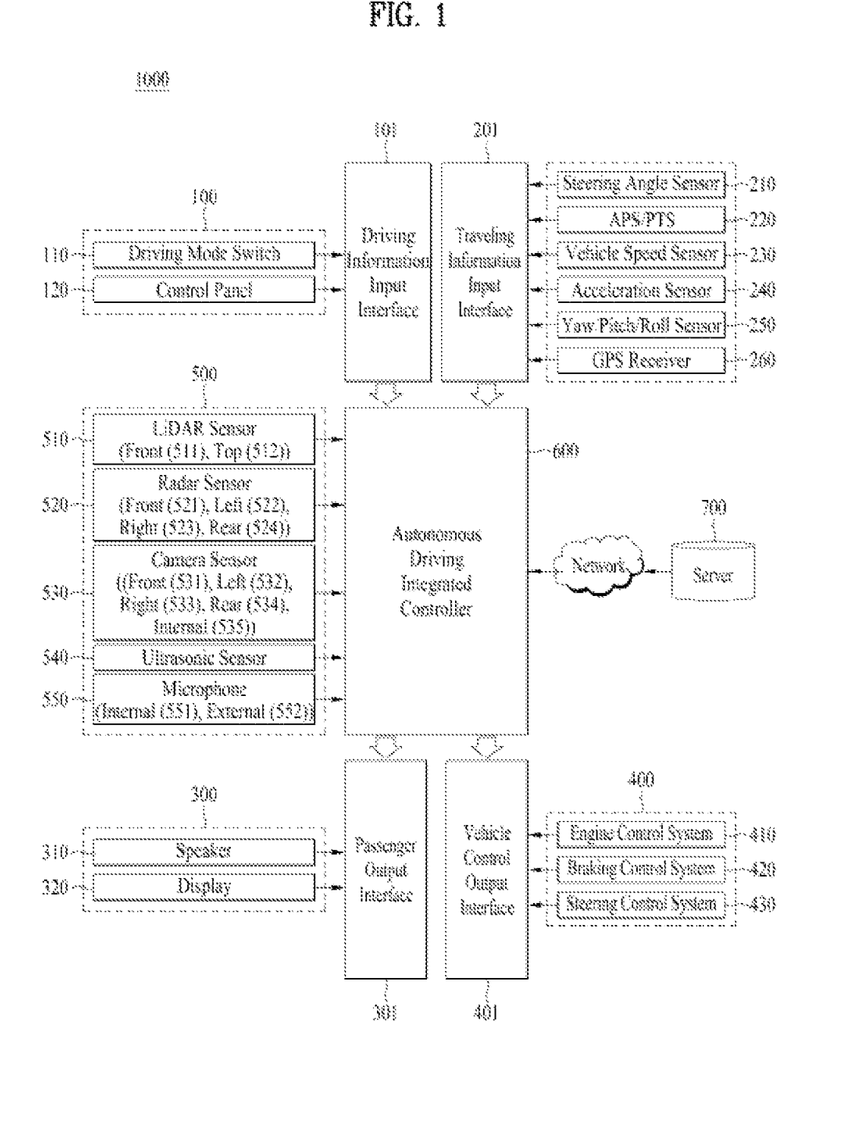
FIG. 1 is an overall block diagram of an autonomous driving control system to which an autonomous driving apparatus according to any one of embodiments of the present disclosure is applicable.
Figure 2:
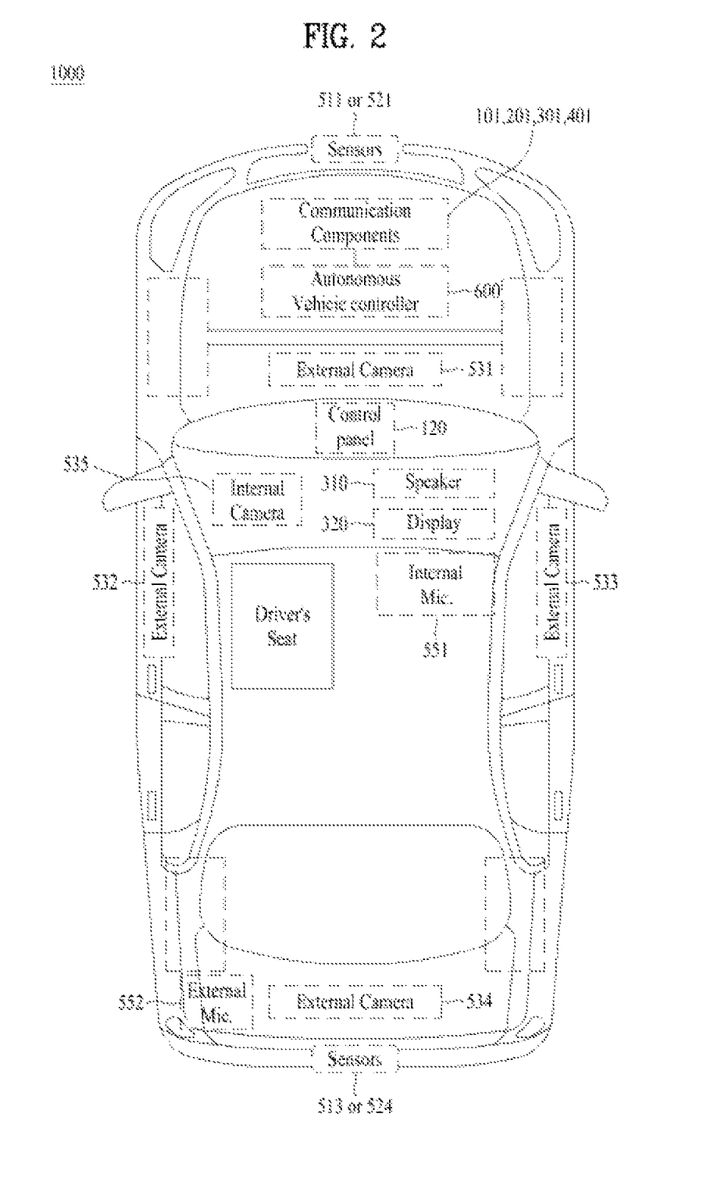
FIG. 2 is a diagram illustrating an example in which an autonomous driving apparatus according to any one of embodiments of the present disclosure is applied to a vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LIDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LIDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LIDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

In FIGS. 1 and 2, the vehicle equipped with an autonomous driving function has been exemplarily described as an embodiment of the present disclosure. However, the present disclosure may also be applied to a general vehicle having only a part of the autonomous driving function or no autonomous driving function at all.

Figure 3:
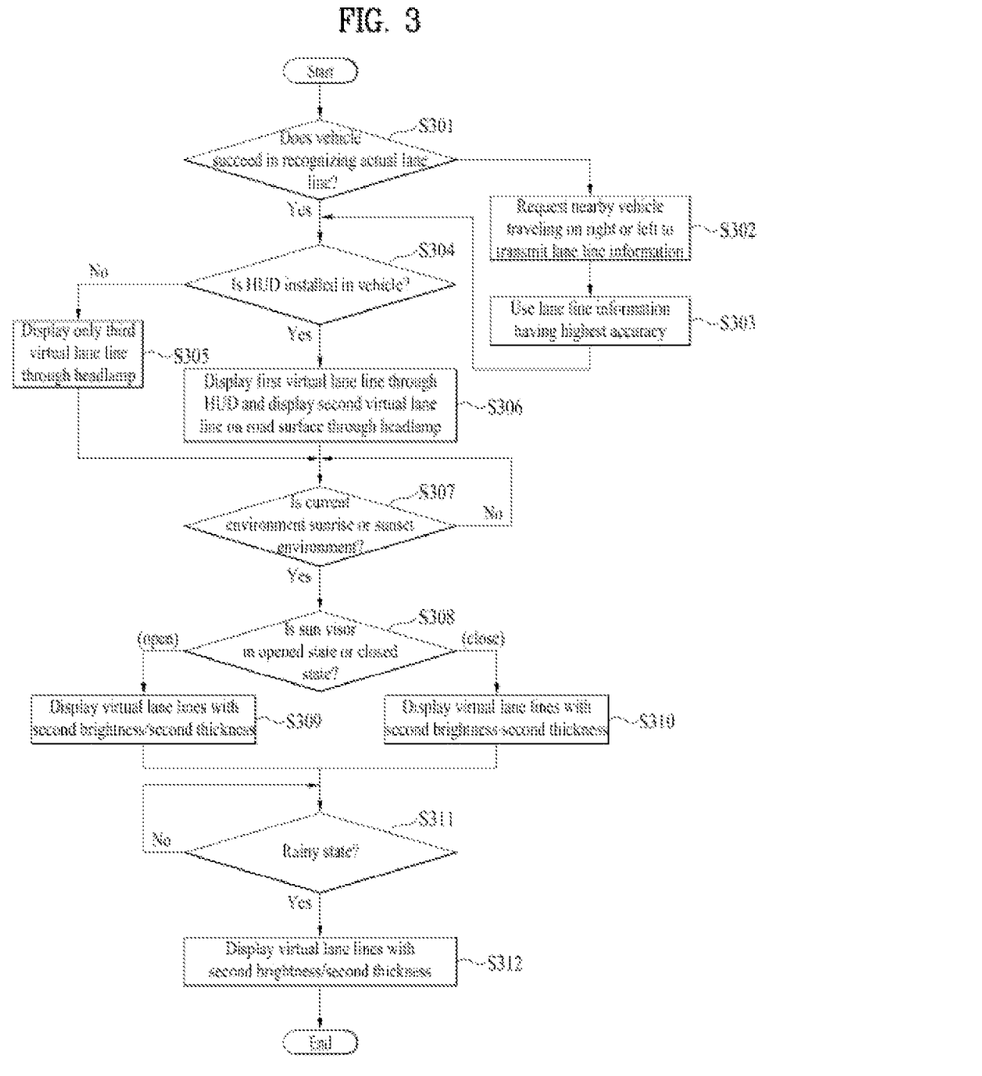
FIG. 3 is a flowchart illustrating in detail a method of controlling an apparatus for displaying at least one virtual lane line based on an environmental condition according to any one of embodiments of the present disclosure.

FIG. 3 is a flowchart illustrating in detail a method of controlling an apparatus for displaying at least one virtual lane line based on an environmental condition according to any one of embodiments of the present disclosure. An embodiment of the present disclosure is to provide a lane line visualization convenience system through virtual lane lines in a poor environment of vehicle driving (e.g., in a rainy, snowy, night driving, sunrise, or sunset environment). In particular, as illustrated in FIG. 3, a driver may more accurately recognize virtual lane lines by adaptively using an augmented reality (AR) head-up display (HUD) function and road irradiation headlamps. In addition, data of virtual lane lines may be differently processed according to various environmental conditions, so that an optimized driving environment may be provided and the rate of vehicle accidents in a poor environment such as rainy weather may be significantly reduced.

First, as illustrated in FIG. 3, the apparatus for displaying at least one virtual lane line based on an environmental condition according to an embodiment of the present disclosure (which may be installed in software/hardware in a vehicle) determines whether a vehicle succeeds in recognizing an actual lane line of a vehicle traveling direction through at least one sensor (S301). This process may be implemented using the sensors and the cameras previously described with reference to FIGS. 1 and 2.

When the actual lane line is recognized as a result of the determination (S301), the apparatus determines whether a HUD is installed in the vehicle (S304).

As a result of the determination (S304), if the vehicle is equipped with the HUD, the apparatus displays a first virtual lane line corresponding to the recognized actual lane line through the HUD and displays a second virtual lane line corresponding to the recognized actual lane line is displayed on a road surface through a headlamp (S306).

Figure 4A:
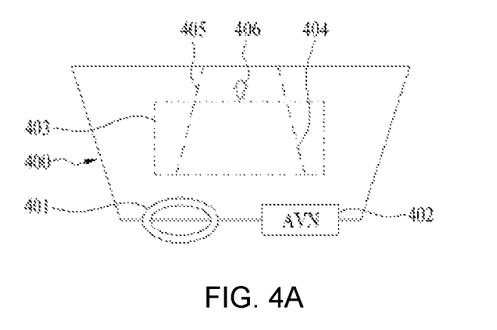
FIGS. 4A and 4B are diagrams illustrating in detail steps S306 and S305 illustrated in FIG. 3, respectively.

An embodiment related to step S306 is illustrated in more detail in FIG. 4A. In FIG. 4A, reference numeral 401 corresponds to a steering wheel generally installed in a vehicle, and reference numeral 402 corresponds to an audio, video, navigation (AVN) unit installed in the vehicle.

Reference numeral 403 denotes a HUD installed in the vehicle. The apparatus performs a control operation to display a first virtual lane line 404 corresponding to the actual lane line through the HUD 403. The first virtual lane line 404 corresponds to a first actual lane line closest to the vehicle based on a vehicle traveling direction.

Reference numeral 400 corresponds to a windshield of the actual vehicle, and a second virtual lane line 405 is displayed on the road surface through the headlamp installed in the vehicle. Additionally, an arrow 406 indicating the vehicle traveling direction may be displayed.

The second virtual lane line 405 illustrated in FIG. 4A corresponds to a second actual lane line located farther than the first actual lane line corresponding to the first virtual lane line 404 based on the vehicle traveling direction.

In particular, when the vehicle is equipped with the HUD, only a part of virtual lane lines may be displayed through the headlamp, and the remaining part may be displayed through the HUD, which has a technical effect that may prevent power consumption of the headlamp or overload of data processing.

In addition, if the virtual lane line through the headlamp is displayed at the position of the virtual lane line displayed through the HUD, this may rather disturb a driver of the vehicle. Therefore, separately displaying the virtual lane line through the HUD and the virtual lane line through the headlamp is also a feature and effect of the present disclosure.

On the other hand, if the HUD is not installed in the vehicle as a result of the determination (S304), the apparatus displays only a third virtual lane line corresponding to the actual lane line recognized in step S301 through the headlamp (S305).

Figure 4B:
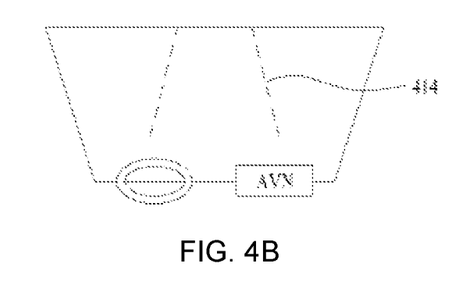

An embodiment related to step S305 is illustrated in more detail in FIG. 4B. A virtual lane line 414 illustrated in FIG. 4B means a virtual lane line displayed on the road surface through the headlamp.

The apparatus determines whether a current environment is a sunrise or sunset environment through at least one sensor installed in the vehicle (S307). For example, receiving information about a sunrise and/or sunset time using a front camera, a drive video record system (DVRS), or an illuminance sensor or based on a GPS through a communication network is also within the scope of the present disclosure. Considering the sunrise or sunset time is to correct the brightness/thickness of the virtual lane lines graphically displayed according to the sunrise/sunset environment.

If the current environment corresponds to the sunrise or sunset environment as a result of the determination (S307), the apparatus additionally determines whether a sun visor attached to the vehicle has been opened or closed (S308).

If the sun visor attached to the vehicle is in an opened state as a result of the determination (S308), the apparatus performs a control operation to display the virtual lane lines in step S305 or S306 with a first brightness and a first thickness (S309).

On the other hand, if the sun visor attached to the vehicle is in a closed state as a result of the determination (S308), the apparatus performs a control operation to display the virtual lane lines in step S305 or S306 with a second brightness and a second thickness (S310).

Figure 5A:
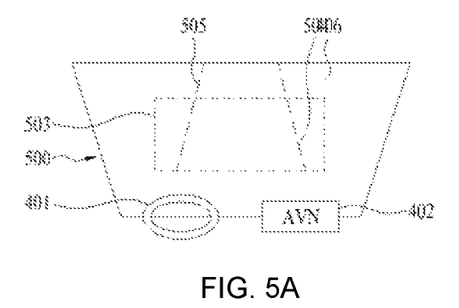
FIGS. 5A and 5B are diagrams illustrating in detail steps S310 and S312 illustrated in FIG. 3, respectively.

An embodiment related to step S310 is illustrated in more detail in FIG. 5A.

The driver may check the virtual lane lines displayed on the HUD 503 and the road surface through a vehicle windshield 500. Both a virtual lane line 504 displayed through a HUD 503 and a virtual lane line 505 displayed through the headlamp are designed to increase brightness and thickness. That is, in the sunrise/sunset environment, when the sun visor is closed, since it is difficult for the driver to recognize lane lines more accurately and quickly, the first brightness in step S309 is higher than the second brightness in step S310 and the first thickness in step S309 is thicker than the second thickness in step S310.

Furthermore, according to an embodiment of the present disclosure, the apparatus determines whether the surroundings of the vehicle are in a rainy state through at least one sensor (S311). The rainy state exemplified herein may include other bad weather conditions such as snowy weather. Step S311 may be determined based on data collected through an automatic light sensor, a rain sensor, a front camera, and a DVRS camera or based on predicted weather information received through a communication network based on GPS information.

If the surroundings of the vehicle are in a rainy state as a result of the determination (S311), the apparatus performs a control operation to display the virtual lane lines with a third brightness (e.g., a maximum brightness value) and a third thickness (e.g., a maximum thickness value) (S312) regardless of whether the sun visor has been opened or closed.

Figure 5B:
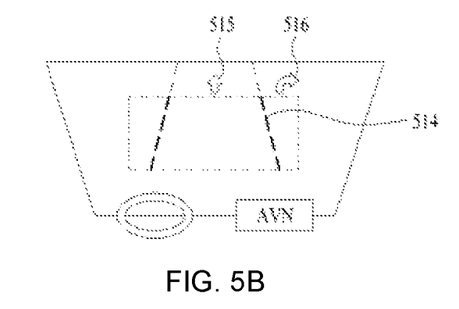

An embodiment related to step S312 is illustrated in more detail in FIG. 5B.

While FIG. 5B illustrates that only a virtual lane line 514 displayed through the HUD is displayed with a maximum brightness and a maximum thickness, a virtual lane line displayed through the headlamp may be displayed with a maximum brightness and a maximum thickness. Alternatively, additionally displaying an arrow 515 indicating a current traveling direction of the vehicle or an arrow 516 indicating a planned traveling direction on the road surface through the headlamp may also fall within another scope of the present disclosure.

Meanwhile, the vehicle may fail to recognize the actual lane line due to performance limitations of the cameras and the sensor of the vehicle as a result of the determination (S301). In this case, steps S302 and S303 may be performed as another embodiment.

Figure 6:
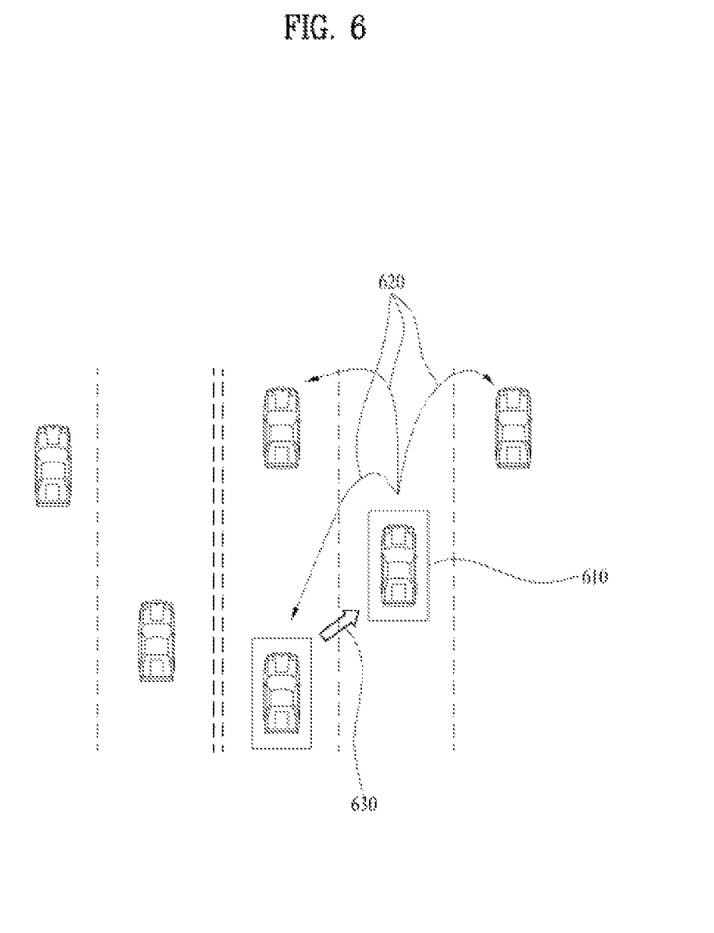
FIG. 6 is a diagram illustrating in more detail steps S302 and S303 illustrated in FIG. 3.

FIG. 6 is a diagram illustrating in more detail steps S302 and S303 illustrated in FIG. 3.

First, a vehicle 610 according to an embodiment of the present disclosure determines whether a consecutive actual lane line (e.g., consisting of dotted lines) on a road surface may be processed (or recognized) as a straight line by connecting, for example, three or more line segments corresponding to the actual lane line, based on a preset reference stored in a memory.

If the vehicle 610 fails to recognize the lane line as the straight line when connecting three or more line segments as a result of the determination, the vehicle 610 requests at least one nearby vehicle 620 traveling on the right or left thereof to transmit lane line information (step S302 of FIG. 3).

The vehicle 610 according to an embodiment of the present disclosure is designed to use lane line information having the highest accuracy out of information received from one or more other vehicles based on the preset reference stored in the memory. Accordingly, when the vehicle 610 fails to recognize a lane line due to the low performance of the cameras/sensors thereof, the vehicle 610 may use lane line information of other vehicles equipped with high-performance cameras/sensors, so that there is an advantage in that accuracy may be improved.

Figure 7:
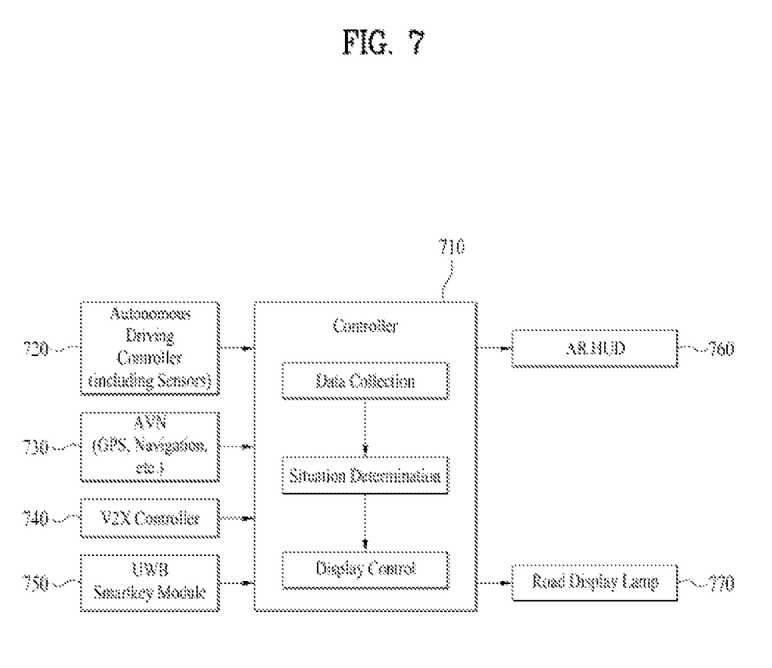
FIG. 7 is a block diagram illustrating an apparatus for displaying at least one virtual lane line based on an environmental condition according to any one of embodiments of the present disclosure.

FIG. 7 is a block diagram illustrating an apparatus for displaying at least one virtual lane line based on an environmental condition according to any one of embodiments of the present disclosure. FIG. 7 may be supplementarily interpreted with reference to FIGS. 1 to 6.

A vehicle according to an embodiment of the present disclosure includes a controller 710, an autonomous driving controller including sensors 720, an AVN 730, a V2X controller 740, a ultra-wideband (UWB) smartkey module 750, an AR HUD 760, and a road display headlamp 770.

The sensor 720 recognizes an actual lane line of a vehicle traveling direction.

The controller 710 determines whether a HUD is mounted in the vehicle. Here, for example, the HUD corresponds to the AR HUD 760 illustrated in FIG. 7. It is necessary for the controller 710 to identify whether the HUD is installed/uninstalled or is broken down depending on vehicles. Whether the HUD is out of order is determined by, for example, whether a response message is received after a request message is transmitted to the AR HUD 76.

When the HUD is installed in the vehicle as a result of the determination, the controller 710 performs a control operation to display a first virtual lane line corresponding to the recognized actual lane line through the HUD 760 and to display a second virtual lane line corresponding to the recognized actual lane line on a road surface through the headlamp 770.

If it is determined that the HUD 760 is not installed in the vehicle, the controller 710 performs a control operation to display only a third virtual lane line corresponding to the recognized actual lane line through the headlamp 770.

The first virtual lane line corresponds to, for example, a first actual lane line closest to the vehicle based on the vehicle traveling direction, and the second virtual lane line corresponds to, for example, a second actual lane line located farther than the first actual lane line based on the vehicle traveling direction.

The controller 710 determines whether a current environment is a sunrise or sunset environment through the at least one sensor 720. If it is determined that the current environment is the sunrise or sunset environment, the controller 710 determines whether a sun visor (not illustrated) attached to the vehicle has been opened or closed.

When the sun visor (not illustrated) attached to the vehicle is in an opened state, the controller 710 performs a control operation to display the virtual lane lines with a first brightness and a first thickness. When the sun visor (not illustrated) attached to the vehicle is in a closed state, the controller 710 performs a control operation to display the virtual lane lines with a second brightness and a second thickness.

The first brightness is higher than the second brightness and the first thickness is thicker than the second thickness.

The controller 710 determines whether the surroundings of the vehicle are in a rainy state through the at least one sensor 720. If it is determined that the surroundings of the vehicle are in a rainy state, the controller 710 performs a control operation to display the virtual lane lines with a third brightness and a third thickness regardless of whether the sun visor (not illustrated) has been opened or closed.

The third brightness corresponds to a maximum brightness value relative to the first brightness and the second brightness, and the third thickness corresponds to a maximum thickness value relative to the first thickness and the second thickness.

The controller 710 determines whether a consecutive actual lane line on the road surface is processed as a straight line by connecting three or more segments corresponding to the actual lane line based on a preset reference stored in a memory (not illustrated). If it is determined that the consecutive actual lane line is not processed as the straight line, the controller 710 performs a control operation to request at least one nearby vehicle traveling on a right side or a left side of the vehicle to transmit lane line information through the V2X controller 740.

The controller 710 uses lane line information having highest accuracy out of lane line information received from the at least one nearby vehicle based on the preset reference stored in the memory (not illustrated).

As another aspect of the present disclosure, the above-described proposal or operation of the disclosure may be provided as code which may be implemented, practiced, or executed by a "computer" (comprehensive concept including a system-on-chip (SoC) or a microprocessor) or as an application, a computer-readable storage medium, or a computer program product, which stores or includes the code, and this is also falls within the scope of the present disclosure.

For example, a computer-readable recording medium storing data for displaying at least one virtual lane line based on to an environmental condition processes data for an actual lane line of a vehicle traveling direction recognized through at least one sensor, processes data for determining whether a head-up display (HUD) has been installed in a vehicle, upon determining that the HUD has been installed in the vehicle, processes data for displaying a first virtual lane line corresponding to the recognized actual lane line through the HUD and displaying a second virtual lane line corresponding to the recognized actual lane line on a road surface through a headlamp, and upon determining that the HUD has not been installed in the vehicle, processes data for displaying only a third virtual lane line corresponding to the recognized actual lane line through the headlamp.

According to any one of the embodiments of the present disclosure, a vehicle accident may be prevented through convergence technology of an AR HUD and a road irradiation headlamp.

According to any one of the embodiments of the present disclosure, a system capable of adaptively controlling at least one of the AR HUD or the road irradiation headlamp according to a poor environment related to vehicle traveling is provided.

According to any one of the embodiments of the present disclosure, fatigue of a driver may be reduced due to virtual lane lines generated by the AR HUD and the road irradiation headlamp.

The effects that are achievable by the present disclosure are not limited to what has been particularly described hereinabove and other advantages not described herein will be more clearly understood by persons skilled in the art from the above description.

As described above, the detailed description of the embodiments of the present disclosure has been given to enable those skilled in the art to implement and practice the disclosure. Although the disclosure has been described with reference to the embodiments, those skilled in the art will appreciate that various modifications and variations may be made in the present disclosure without departing from the spirit or scope of the disclosure and the appended claims. For example, those skilled in the art may use constructions disclosed in the above-described embodiments in combination with each other.

Accordingly, the present disclosure should not be limited to the specific embodiments described herein, but should be accorded the broadest scope consistent with the principles and features disclosed herein.

What is claimed is:

1. A method of controlling an apparatus for displaying at least one virtual lane line based on an environmental condition, the method comprising:
   recognizing an actual lane line of a vehicle traveling direction using at least one sensor;
   determining whether a head-up display (HUD) has been installed in a vehicle;
   upon determining that the HUD has been installed in the vehicle, displaying a first virtual lane line corresponding to the recognized actual lane line through the HUD and displaying a second virtual lane line corresponding to the recognized actual lane line on a road surface through a headlamp; and upon determining that the HUD has not been installed in the vehicle, displaying only a third virtual lane line corresponding to the recognized actual lane line through the headlamp.

2. The method of claim 1, wherein the first virtual lane line corresponds to a first actual lane line closest to the vehicle based on the vehicle traveling direction, and the second virtual lane line corresponds to a second actual lane line located farther than the first actual lane line based on the vehicle traveling direction.

3. The method of claim 1, further comprising:
determining whether a current environment is a sunrise or sunset environment using the at least one sensor; and
upon determining that the current environment is the sunrise or sunset environment, determining whether a sun visor attached to the vehicle has been opened or closed.

4. The method of claim 3, further comprising:
upon determining that the sun visor is in an opened state, performing a control operation to display the virtual lane lines with a first brightness and a first thickness; and
upon determining that the sun visor is in a closed state, performing a control operation to display the virtual lane lines with a second brightness and a second thickness,
wherein the first brightness is brighter than the second brightness and the first thickness is thicker than the second thickness.

5. The method of claim 4, further comprising:
determining whether surroundings of the vehicle are in a rainy state using the at least one sensor; and
upon determining that the surroundings of the vehicle are in a rainy state, performing a control operation to display the virtual lane lines with a third brightness and a third thickness regardless of whether the sun visor has been opened or closed,
wherein the third brightness corresponds to a maximum brightness value relative to the first brightness and the second brightness, and
the third thickness corresponds to a maximum thickness value relative to the first thickness and the second thickness.

6. The method of claim 1, wherein the recognizing further comprises:
determining whether a consecutive actual lane line on the road surface is processed as a straight line by connecting three or more line segments corresponding to the actual lane line based on a preset reference stored in a memory; and
upon determining that the consecutive actual lane line is not processed as the straight line, requesting at least one nearby vehicle traveling on a right side or a left side to transmit lane line information.

7. The method of claim 6, wherein lane line information having a highest accuracy is used out of lane line information received from the at least one nearby vehicle based on the preset reference stored in the memory.

8. A computer readable recording medium storing data for displaying at least one virtual lane line based on an environmental condition, wherein the computer readable recording medium is configured to:
process data for an actual lane line of a vehicle traveling direction recognized using at least one sensor;
process data for determining whether a head-up display (HUD) has been installed in a vehicle;
upon determining that the HUD has been installed in the vehicle, process data for displaying a first virtual lane line corresponding to the recognized actual lane line through the HUD and displaying a second virtual lane line corresponding to the recognized actual lane line on a road surface through a headlamp; and
upon determining that the HUD has not been installed in the vehicle, process data for displaying only a third virtual lane line corresponding to the recognized actual lane line through the headlamp.

9. An apparatus for displaying at least one virtual lane line based on to an environmental condition, the apparatus comprising:
a sensor configured to recognize an actual lane line of a vehicle traveling direction; and
a controller configured to determine whether a head-up display (HUD) has been installed in a vehicle,
wherein the controller performs, upon determining that the HUD has been installed in the vehicle, a control operation to display a first virtual lane line corresponding to the recognized actual lane line through the HUD and display a second virtual lane line corresponding to the recognized actual lane line on a road surface through a headlamp, and
the controller performs, upon determining that the HUD has not been installed in the vehicle, a control operation to display only a third virtual lane line corresponding to the recognized actual lane line through the headlamp.

10. The apparatus of claim 9, wherein the first virtual lane line corresponds to a first actual lane line closest to the vehicle based on the vehicle traveling direction, and the second virtual lane line corresponds to a second actual lane line located farther than the first actual lane line based on the vehicle traveling direction.

11. The apparatus of claim 9, wherein the controller:
determines whether a current environment is a sunrise or sunset environment using the at least one sensor; and
upon determining that the current environment is the sunrise or sunset environment, determines whether a sun visor attached to the vehicle has been opened or closed.

12. The apparatus of claim 11, wherein the controller:
performs, upon determining that the sun visor is in an opened state, a control operation to display the virtual lane lines with a first brightness and a first thickness; and
performs, upon determining that the sun visor is in a closed state, a control operation to display the virtual lane lines with a second brightness and a second thickness, and
wherein the first brightness is brighter than the second brightness and the first thickness is thicker than the second thickness.

13. The apparatus of claim 12, wherein the controller:
determines whether surroundings of the vehicle are in a rainy state using the at least one sensor; and
performs, upon determining that the surroundings of the vehicle are in a rainy state, a control operation to display the virtual lane lines with a third brightness and a third thickness,
wherein the third brightness corresponds to a maximum brightness value relative to the first brightness and the second brightness regardless of whether the sun visor has been opened or closed, and the third thickness corresponds to a maximum thickness value relative to the first thickness and the second thickness.

14. The apparatus of claim 9, wherein the controller:

determines whether a consecutive actual lane line on the road surface is processed as a straight line by connecting three or more line segments corresponding to the actual lane line based on a preset reference stored in a memory; and upon determining that the consecutive actual lane line is not processed as the straight line, requests at least one vehicle traveling on a right side or a left side to transmit lane line information.

15. The apparatus of claim 14, wherein the controller uses lane line information having a highest accuracy out of lane line information received from the at least one nearby vehicle based on the preset reference stored in the memory.

* * * * *